(No Model.)
M. W. DEWEY.
METHOD OF ELECTRIC WELDING.
No. 435,643. Patented Sept. 2, 1890.
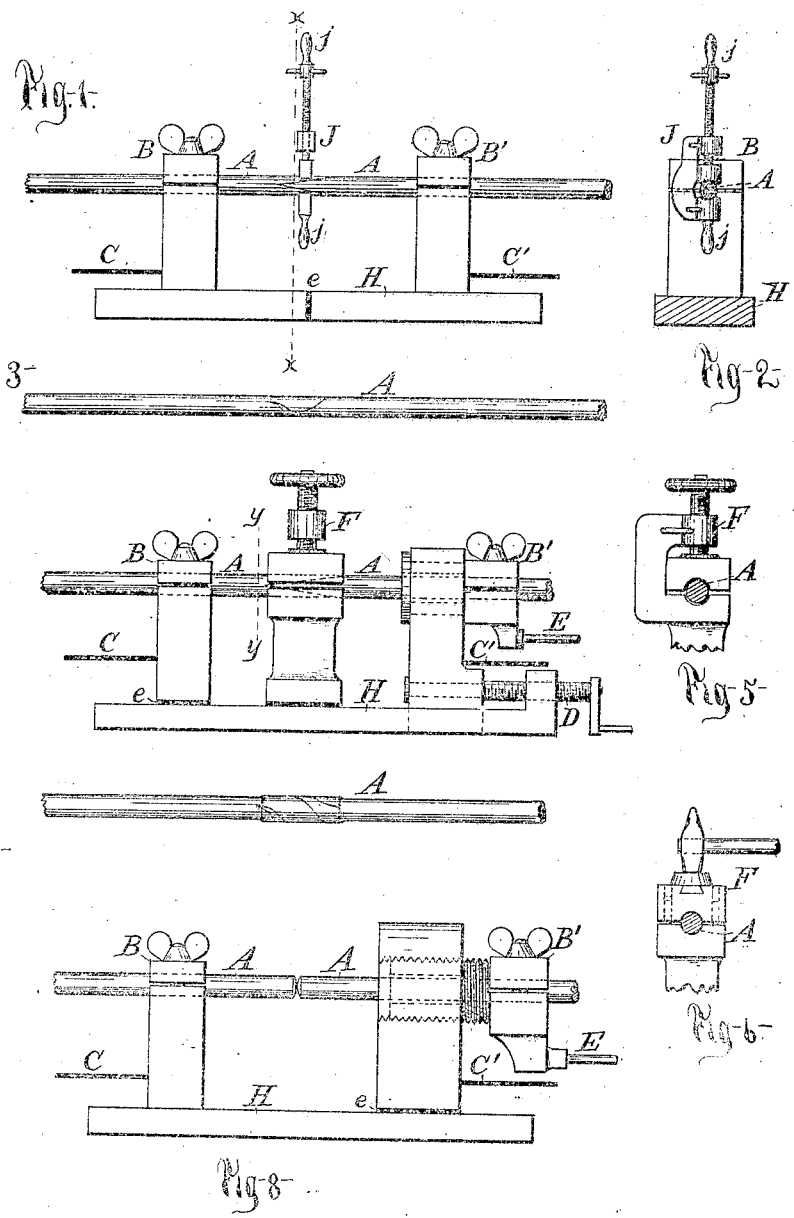
WITNESSES:
J. J. Laass
C. L. Bendixon
INVENTOR,
Mark W. Dewey.
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC WELDING.

SPECIFICATION forming part of Letters Patent No. 435,643, dated September 2, 1890.

Application filed June 12, 1890. Serial No. 355,258. (No model.)

*To all whom it may concern:*

Be it known that I, MARK W. DEWEY, of Syracuse, in the county of Onondaga, in the State of New York, have invented new and useful Improvements in Methods of Electric Welding, (Case No. 60,) of which the following, taken in connection with the accompanying drawings, is a full, clear, and exact description.

My invention relates to methods or processes of forming welded or brazed joints between two metal pieces or portions of a metal object consisting, essentially, in electrically heating the material at the junction to soften the same, as by passing a heavy electric current from one side to the other of the joint, and then, when the material is properly heated, subjecting the joint to a force tending to compress and twist the same.

It has been found that the ordinary electric joint or weld becomes greatly weakened if reheated, owing to an imperfect interknitting or intermingling of the atoms of the metal when the joint was formed; and the object of my invention is to strengthen the joint by interlocking the same by twisting the metal at the junction while in a heated or softened condition.

The apparatus or means for effecting the twisting operation upon the welding or welded junction may be of any suitable construction, but is preferably the same or similar to the devices shown in the accompanying drawings, hereinafter described.

In the drawings, Figure 1 is a front elevation of an apparatus suitable for practicing my invention. Fig. 2 is a sectional elevation on line $x\ x$ of Fig. 1. Fig. 3 is a specimen of a weld after the operation. Fig. 4 is a front elevation of another form of apparatus for practicing my method. Fig. 5 shows a part of Fig. 4 on line $y\ y$. Fig. 6 is a modified form of the same part. Fig. 7 is a specimen of the work done with the latter apparatus, and Fig. 8 shows a front view of an apparatus more especially designed for effecting buttjoints by my method.

Referring specifically to the drawings, in Figs. 1 and 2, B and B' are clamps or holders, mounted upon a base H and insulated from one another at $e$.

C and C' indicate electric conductors connected to the clamps, and which may be connected with any suitable source of heavy electric current, such, for instance, as that described in my prior patents in metal working, No. 402,416, dated April 30, 1889, and No. 408,875, dated August 13, 1889.

The clamps serve to hold the bars or pieces A to be welded and to convey the current thereto. In this case the said pieces are shown arranged to be united by a lap-weld where their ends meet. The electric current is passed through the pieces between the clamps, so as to heat or soften the metal at the junction, as desired. A suitable pressure-clamp J is applied to press laterally upon the pieces at the joint to force together and keep the parts in contact, while by means of the handles $j\ j$ on the clamp the joint is wrenched or twisted, when sufficiently softened in a manner the same or similar to that shown in Fig. 3, thus forming a thoroughly-united joint, which will stand a very great strain, even when in a heated condition. When the pieces are to be brazed, brass with borax may be applied to the joint before or while effecting the twisting operation.

Similar letters of reference indicate corresponding parts throughout the drawings.

In the apparatus shown in Fig. 4 the clamp B' is arranged movable toward and from the other clamp B, by means of a screw D, and is also arranged to be rotated in its support by the handle E.

Between the clamps B and B' is a stationary insulated pressure-clamp or die-press F for producing lateral pressure upon the joint during the twisting operation which is effected by rotating the clamp B'.

In order to form a weld with this apparatus, the pieces to be united are preferably placed in contact with each other and in the clamps. Then the current is passed through said pieces to soften them. The die-press is, by means of its screw, brought close to the joint, but not so as to press the same tightly, as that would hinder the twisting of the metal at the joint between the dies when the clamp B' is rotated. Then the said clamp is rotated by means of the handle E, and the junction or softened part is twisted. The said joint may be completed or finished, if desired, either by moving the clamp B', by means of the screw D, toward the other clamps to upset the metal at the joint between the dies, giving an appearance to the weld similar to that represented in Fig. 7, or, by effecting greater pressure upon the junction by means of the press F. It will be obvious that this pressure may be applied in either way simultaneously with the twisting operation, if desired.

Instead of employing a screw-operated press for effecting lateral pressure, such pressure may be applied by hammering, as clearly illustrated in Fig. 6.

Not only is electric lap-welding improved and strengthened by twisting the junction while being welded or in a softened condition, but butt-welding is also greatly improved by my process as the atoms or fibers of the metal in the parts become more closely united or interwoven one with the other.

In the apparatus shown in Fig. 8 the rotatable clamps B' is provided with a screw where it turns in its support, so that the pieces to be welded are moved together simultaneously with the twisting operation produced by rotating the clamp by means of the handle E. The apparatus shown in Fig. 4 may be also used for butt-welding by using the screw D to move the pieces together and the rotatable clamp with its handle E to twist the metal. In some cases the clamp B' may be rotated first in one direction and then in the other.

I prefer to perform the twisting operation while the pieces are still heated by the current used in welding, but do not limit myself to so doing, since obviously the piece might be allowed to cool and be afterward again heated and then twisted.

Having described my invention, what I claim is—

1. The improvement in electric welding, consisting in twisting the material at the welding-junction while said junction is electrically heated.

2. The improvement in electric welding, consisting in electrically heating the parts to be united and then applying pressure or force tending to move together the pieces to be welded and to twist them at the junction.

3. The method or process of metal-working, consisting in electrically heating and softening the junction of pieces of metal by traversing it with a heavy electric current and then applying a force to twist the metal at the junction.

4. The herein-described method of electric welding, consisting in passing an electric current through the metal from one side to the other of the joint and then applying lateral pressure to the metal at the part where the joint is to be formed, together with a force tending to twist said part.

5. The herein-described method of electric welding, consisting in suitably shaping and lapping the ends of the pieces of metal to be united, passing an electric current through the pieces from one side to the other of the joint, and then applying pressure or force tending to move together the pieces to be welded and to twist them at the point of union.

6. The method of electric welding, consisting in applying to suitably guided and clamped pieces to be joined a heavy electric current at the junction to soften them, and a force to twist and compress the pieces.

7. The method of electric welding, consisting in applying to suitably guided and clamped pieces to be joined a heavy electric current at the junction simultaneously with a force to twist the pieces.

In testimony whereof I have hereunto signed my name this 3d day of June, 1890.

MARK W. DEWEY. [L. S.]

Witnesses:
C. H. DUELL,
J. J. LAAS.